US006495179B1

(12) United States Patent
Zietlow et al.

(10) Patent No.: US 6,495,179 B1
(45) Date of Patent: Dec. 17, 2002

(54) APPEARANCE MODIFIED AERATED CONFECTION AND METHOD OF PREPARATION

(75) Inventors: Philip K. Zietlow, Wayzata, MN (US); Dean Franssell, Hamel, MN (US); S. Ganesh Ganesan, Maple Grove, MN (US); Mathew F. Langenfeld, Rosemount, MN (US); Philip E. Palkert, Eden Prairie, MN (US); James L. Stinson, Wayzata, MN (US); Bernhard van Lengerich, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/298,715

(22) Filed: Apr. 23, 1999

(51) Int. Cl.[7] ................................. A23G 3/00
(52) U.S. Cl. .................. 426/103; 426/89; 426/289; 426/291; 426/302; 426/303; 426/305; 426/571; 426/516
(58) Field of Search ................. 426/302, 303, 426/89, 103, 571, 516, 305, 289, 291

(56) References Cited

U.S. PATENT DOCUMENTS

| | | | | |
|---|---|---|---|---|
| 1,327,113 A | * | 1/1920 | Overbeck | 426/103 |
| 1,502,207 A | * | 7/1924 | Paine | 426/103 |
| 1,877,641 A | * | 9/1932 | Bolton | 426/103 |
| 2,520,581 A | * | 8/1950 | Turner | 426/571 |
| 2,847,311 A | * | 8/1958 | Doumak | 426/516 |

(List continued on next page.)

FOREIGN PATENT DOCUMENTS

| | | |
|---|---|---|
| DE | 4436362 A | 5/1995 |
| EP | 815741 A | 1/1998 |
| FR | 2773952 | 7/1999 |
| JP | 6181691 | 5/1994 |

OTHER PUBLICATIONS

Morgan 1982 Cho colate & Candy Cookbook Arco Publishing New York p 67–71, 15, 16, 18, 19, 21.*
Gutterson CIRCA 1969 Confectionary Product Manufacturing Process Novey Development Corp. New Jersey p200–206.*
Alikonis CIRCA 1979 Candy Technology AVI Publishing West Port CT p 83–91.*
Van Der Schaff Dec. 17, 1974 *The Mondomix Process for the Manufacture of Aerated Sugar Confectionery*.
1992 Commercial Brochure Bepex Corporation.

Primary Examiner—Milton I. Cano
Assistant Examiner—Robert Madsen
(74) Attorney, Agent, or Firm—John A. O'Toole; Timothy A. Czaja; Everett G. Diederiks, Jr.

(57) ABSTRACT

Aerated confections in the form of pieces having a body color and a body exterior surface importantly characterized by at least a portion of which has been modified to provide an appearance disparate to the body. The aerated food products comprise 50 to 98% of a saccharide component; about 0.5 to 30% of a structuring agent; and about 1 to 8% moisture. The aerated food products have a density of about 0.1 to 1.0 g/cc. The products are additionally characterized by having an external surface, and wherein at least a portion of the external surface has a distinguishing feature differing from the body in color, texture or structure. Preparation methods are disclosed directed to a mass of aerated confection pieces having at least one colored portion and having an external surface; applying a substance, at least a fraction of which has a second color, to adhere to the external surface and to define sticky aerated confection pieces; and, forming the sticky aerated confection pieces into finished non-sticky coated pieces, The confectionery food products find particular suitability for use as ingredients for children's RTE cereals.

63 Claims, 1 Drawing Sheet

U.S. PATENT DOCUMENTS

| | | | | |
|---|---|---|---|---|
| 3,012,893 A | * | 12/1961 | Kremzner | |
| 3,018,183 A | * | 1/1962 | Downey | |
| 3,062,661 A | * | 11/1962 | Doumak | |
| 3,206,315 A | * | 9/1965 | Anderson | |
| 3,220,853 A | * | 11/1965 | Golosinec | |
| 3,221,675 A | * | 12/1965 | Forkner | 426/302 |
| 3,228,357 A | * | 1/1966 | Bruschke | 426/293 |
| 3,345,186 A | * | 10/1967 | Kania | |
| 3,490,920 A | * | 1/1970 | Grettie | 426/571 |
| 3,527,646 A | * | 9/1970 | Scheick | 426/289 |
| 3,556,812 A | | 1/1971 | Krohn et al. | |
| 3,607,309 A | | 9/1971 | Olney et al. | 99/134 A |
| 3,615,592 A | * | 10/1971 | Peterson | 426/103 |
| 3,615,593 A | * | 10/1971 | Patil | 426/103 |
| 3,620,769 A | * | 11/1971 | Peterson | 426/89 |
| 3,682,659 A | * | 8/1972 | Jurczak | 426/571 |
| 3,684,528 A | * | 8/1972 | Betey | 426/571 |
| 3,976,803 A | * | 8/1976 | Koppijn | 426/572 |
| 3,998,976 A | * | 12/1976 | Pernod | 426/103 |
| 4,010,283 A | * | 3/1977 | Canonne | 426/103 |
| 4,018,900 A | * | 4/1977 | Hayward | 426/72 |
| 4,038,423 A | | 7/1977 | Hayward et al. | 426/72 |
| 4,039,688 A | * | 8/1977 | Hayward | 426/103 |
| 4,049,832 A | * | 9/1977 | Hayward | 426/72 |
| 4,120,987 A | * | 10/1978 | Moore | 426/572 |
| 4,189,502 A | * | 2/1980 | Rubenstein | 426/571 |
| 4,251,561 A | | 2/1981 | Gajewski | 426/571 |
| 4,323,588 A | * | 4/1982 | Vink | 426/564 |
| 4,410,552 A | * | 10/1983 | Gaffney | 426/103 |
| 4,410,555 A | | 10/1983 | Richardson | 426/572 |
| 4,415,595 A | | 11/1983 | Takemori et al. | 426/101 |
| 4,560,562 A | | 12/1985 | Schroeder | 426/87 |
| 4,601,907 A | * | 7/1986 | Knebl et al. | 426/3 |
| 4,698,232 A | * | 10/1987 | Sheu | 426/103 |
| 4,702,925 A | * | 10/1987 | Verrico | 426/103 |
| 4,720,378 A | * | 1/1988 | Forse | 426/302 |
| 4,774,100 A | | 9/1988 | Markwardt et al. | 426/572 |
| 4,785,551 A | | 11/1988 | Meyer | 34/10 |
| 4,832,966 A | * | 5/1989 | Newsteder | 426/103 |
| 4,853,235 A | | 8/1989 | Tomomatsu | 426/93 |
| 4,913,924 A | | 4/1990 | Moore | 426/578 |
| 4,925,380 A | | 5/1990 | Meisner | 425/131.1 |
| 5,017,394 A | * | 5/1991 | Macpherson | 426/103 |
| 5,019,404 A | | 5/1991 | Meisner | 426/249 |
| 5,030,460 A | | 7/1991 | Baggerly | 426/103 |
| 5,030,469 A | * | 7/1991 | Mergelsberg | 426/571 |
| 5,230,918 A | | 7/1993 | Anderson et al. | 426/572 |
| 5,342,635 A | * | 8/1994 | Schwab | 426/241 |
| 5,362,505 A | * | 11/1994 | Hsieh et al. | 426/93 |
| 5,429,830 A | | 7/1995 | Janovsky | 426/94 |
| 5,429,836 A | * | 7/1995 | Fuisz | 426/601 |
| 5,451,419 A | * | 9/1995 | Schwab | 426/564 |
| 5,462,760 A | * | 10/1995 | Serpelloni | 426/572 |
| 5,532,017 A | | 7/1996 | O'Donnell et al. | 426/571 |
| 5,789,002 A | | 8/1998 | Duggan et al. | 426/3 |
| 5,834,047 A | * | 11/1998 | Ahn | 426/89 |
| 5,882,707 A | * | 3/1999 | Grillo | 426/305 |

* cited by examiner

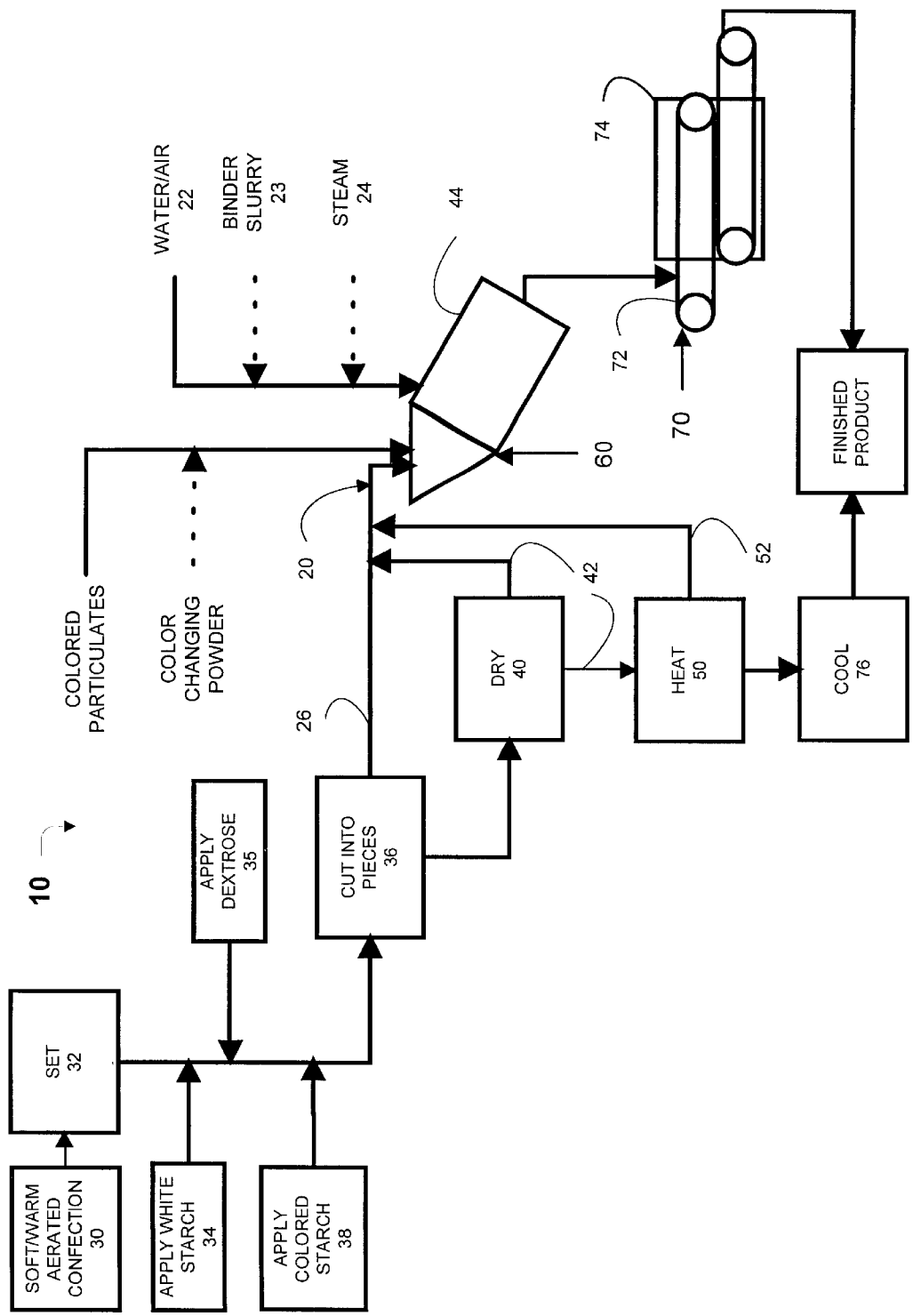

APPEARANCE MODIFIED AERATED CONFECTION AND METHOD OF PREPARATION

FIELD OF THE INVENTION

The present invention is directed generally to food products and to their methods of preparation. In particular, the present invention is directed to improved aerated confectionery products such as dried marshmallows having a modified surface and to processes for making such surface modified aerated, confectionery products.

BACKGROUND

Aerated confections products are popular food items. Some products are fabricated from aerated confections compositions that comprise a fat constituent while others are substantially free of such fat constituents. An illustrative fat free aerated confection is the common marshmallow. Such marshmallow products are familiar in both larger and smaller sizes.

It is well known that such marshmallows when fresh are soft and pliable but will stale by losing moisture and become hard. Indeed, purposefully pre-dried aerated confections are also well known. These products, particularly in smaller or bit sizes, are commonly added to certain popular Ready-To-Eat ("RTE") breakfast cereals, particularly those marketed to children. Due to their small size (i.e., having a number count of 4 to 6/g), these dried aerated confectionery marshmallow products are sometimes colloquially referred to as "Mar." bits or "marbits". The marbits must be pre-dried prior to admixture with the RTE cereal in order to reduce unwanted moisture migration from the marbit to the cereal and thus to forestall the multiple problems resulting therefrom.

While there are many types of marshmallow products on the market, their methods of preparation generally fall into two main process groups: extruded marshmallow and deposited marshmallow. In both types, a sugar syrup and a structuring agent (such as an albumin, agar or, preferably a gelatin) are the two main ingredients. Typically, the sugar syrup is heated to reduce moisture and is thereafter cooled down, and then combined with the gelatin solution to form a slurry. That slurry is then aerated to form a foam, and after aeration, colors and flavors are then added to the foam. The particular marshmallow product may be formed into its final shape by an extrusion process. That is, after aeration, the foam is extruded through a dye to form a rope. The dye imparts the desired peripheral shape to the extrudate rope. The rope is allowed to rest briefly to set, and then is cut into desired sizes. For dried marshmallows, the process can additionally include one or more drying steps. (See, for example U.S. Pat No. 4,785,551 issued Nov. 2, 1988 to W. J. Meyer entitled "Method of Drying Confection Pieces").

While marshmallows of a single color are most common, marshmallows having two or even a plurality of colors (collectively herein, "multi-colored") are also known (see, for example, D 376,039 issued Dec. 3, 1996 entitled "Food Product" showing a two color marbit design) as well as methods for their preparation. (See, for example, U.S. Pat. No. 4,925,380 issued Oct. 20, 1986 entitled "Multicolor Confection Extrusion System and U.S. Pat. No. 5,019,404 issued Feb. 28, 1990 entitled "Multicolor Confection Extrusion System", each of which are incorporated herein by reference). Both the '404 and '380 well describe the difficulties and sensitivities of such foam product preparation.

The conventional processes for making multi-colored marshmallows teach to divide the aerated foam into a plurality of sub-streams, to admix a desired colorant to each sub-stream, and then extrude these colored sub-streams in substantially equal portions into a single rope or multiplicity of such ropes.

While multi-colored marshmallow pieces have enhanced consumer appeal particularly for children's products, there is a continuing need for new confection products having novel appearance and appeal.

The present invention provides improvements to aerated confections especially dried marshmallow pieces. More particularly, the present invention relates to dried marshmallow pieces having surface modifications to alter their appearance and to methods of preparing such appearance modified aerated confection pieces.

In certain preferred embodiments, the provision of a surface modified appearance involves applying a topical particulate coating. Since fresh or undried aerated confections are naturally sticky, a topical starch coating is conventionally applied to eliminate the sticky surface attribute. Excess starch is removed such as by vibration. While effective, residual starch renders the aerated confections' surface so resistant to adhesion that providing a coating, especially a discontinuous particulate coating, that resists separation is difficult. Adhering particulate coating is even more challenging for dried aerated confection since drying further reduces surface stickiness. The present invention provides methods for preparing coated dried aerated confections that overcome the problems of resistance to adhesion.

SUMMARY OF THE INVENTION

In its product aspect, the present invention resides in aerated confections in the form of pieces having a body color and a body exterior surface importantly characterized by at least a portion of which has been modified to provide an appearance disparate to the body.

The aerated confections comprise a body fabricated from an aerated confection comprising:
  about 50 to 95% of a saccharide component;
  about 1 to 30% moisture;
  about 0.5 to 30% of a structuring agent; and, The confection compositions have densities of 0.10 to 1.0 g/cc.

The products are additionally characterized by a size of 0.1 to 5/g. These products can have a body of one color or the body can comprise a plurality of disparately colored phases. The products further can comprise a surface including a coating in a weight ratio of coating to body ranging from about 0.1:100 to about 30:100.

In its principal method aspect, the present invention provides methods for preparing an aerated confection, comprising the steps of:

A. Topically applying a substance to adhere to aerated confection pieces having at least one portion having a first color and having a moisture content of about 1% to 30% to provide sticky aerated confection pieces having the substance adhered thereto; and
  B. Processing the sticky aerated confection pieces having the substance adhered thereto to form non-sticky, dried aerated confection pieces with the substances adhered having a moisture content of about 1% to 8%.

DESCRIPTION OF THE DRAWINGS

FIG. 1 is a schematic process flow diagram of one preferred embodiment of the present method of preparation.

DETAILED DESCRIPTION OF THE INVENTION

The present invention provides appearance modified aerated confections products and to methods for preparing such aerated confections products. Each of the product ingredients and product features and steps of the present methods are described in detail below.

Throughout the specification and claims, percentages are by weight and temperatures in degrees Fahrenheit unless otherwise indicated.

Broadly, the present invention relates to dried aerated confections pieces having substances adhered to their exterior surfaces to modify their external appearance and to methods for preparing such dried aerated confectionery pieces. Generally, their methods of preparation involve adhering substances to the exterior of the aerated confectionery pieces to form sticky pieces with substances adhering to at least a portion of their exterior and processing the sticky pieces to form non-sticky pieces.

The adhering substance can either be a liquid or be in particle form or be a mixture. For example, a mixture could involve an edible ink wherein a liquid carrier serves to suspend an edible ink colorant or pigment.

More specifically, either the aerated confection pieces can be themselves be sticky, or the substances that are adhered thereto can themselves be sticky or both the pieces and the adhering substance can each be sticky.

In preferred embodiments, the aerated confection pieces are sticky or are made sticky. In this preferred embodiment, the methods herein essentially include a first step of providing a quantity or supply of solid aerated confection pieces. By "aerated confection product" is meant an aerated solid confectionery food product in solid form having a density in the range of from about 0.10 to about 1.0 g/cc and comprising saccharides, a foam structuring agent, and moisture. By "solid" is meant that a warm aerated confectionery foam has been allowed to at least partially set such as by cooling to below the set temperature of its foam structuring component.

The aerated confectionery compositions products are fabricated from compositions that essentially comprise about 50 to about 95% of a saccharide component as the principle ingredient. Preferably, the saccharide component is used at about 70 to 90% of the confectionery compositions. The saccharide component can include pure monosaccharide dextrose (e.g., anhydrous, monohydrate or dextrose syrup) and disaccharide sugars such as sucrose, and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as fruit juices, purees, honey nectars, concentrated fruit juices, fruit flavors and mixtures thereof. The saccharide component can also include polysaccharides such as cornstarch.

The confection essentially further includes about 0.5 to 30%, preferably about 1 to 4%, and most preferably about 2.5 weight percent of a foam structuring or gelling component. Suitable structuring components include hydrocolloid colloids such as pectin, gelatin, modified starches, gums (e.g., guar) and mixtures thereof. For products to be marketed in North America, the preferred structuring agent is gelatin. The gelatin can be derived from bovine, porcine, or piscine (fish) sources or can be of mixtures thereof. Preferred for use herein for cost and purity is bovine gelatin.

The present aerated confectionery compositions can range in moisture content about 1 to 30%. In one variation, the aerated confections can be in the form of a soft marshmallow defined in part by a moisture content of about 10 to 30%, preferably 12 to 18%. In another preferred variation, the marshmallows are dried to form dried frangible compositions having a moisture content ranging from about 1–6%, preferably about 2–5%.

The food product compositions can further comprise a wide variety of supplemental materials to improve the organoleptic, visual, or nutritional properties of the finished confectionery products. Useful materials include, for example, colors, flavors, high potency sweeteners, preservatives, nutritional fortifying ingredients and mixtures thereof. If present, such optional materials can collectively comprise from about 0.01% to about 25% by weight of the present products, preferably about 1 to 10%.

More preferably, any insoluble component such as mineral fortifying ingredient (e.g., calcium carbonate for calcium fortification) is added in the form of a fine powder having a particle size such that 90% has a particle size of less than 150 micron, preferably 100 $\mu$m or less in size.

In highly preferred embodiments, the present products comprise a calcium ingredient of defined particle size in an amount effective to provide the desired calcium enrichment. Good results are obtained when the present aerated confectionery compositions comprise sufficient amounts of calcium ingredients to provide the total calcium content of the composition to from about 50 to 2500 mg per 28.4 g (1 oz) serving (dry basis) (i.e., about 0.15 to 10% by weight, dry basis) of calcium, preferably about 100 to 1500 mg Ca per 28.4 g (1 oz.), and more preferably about 200 to 1500 mg Calcium/oz.

Useful herein to supply the desired calcium levels are calcium ingredients that supply at least 20% calcium. Preferred for use herein are calcium ingredients selected from the group consisting of food grade calcium carbonate, ground limestone, calcium phosphate salts and mixtures thereof.

In one preferred embodiment, the marshmallows are fat free, i.e., have fat contents of less than 0.5% (dry weight basis). Low fat products are preferred for use herein since such products are more easily able to be formulated to form the present quickly dissolving products. In these embodiments, the fat level is provided by lipid content associated with one or more ingredients as compared to addition of a fat component. In other variations, e.g., chocolates, the aerated confection can comprise about 1 to 25% of an added fat component homogeneously blended with the other components preferably about 1 to 10% such as cocoa butter, dairy fat or dairy fat containing (e.g., cheese) or other edible fatty triglyceride or fat mimics such as sucrose polyesters.

The compositions can be optionally flavored and/or colored to provide uniform products or products having phases of variously colored and flavored potions. By "color" is meant a confection of any color, including white, which may be provided by the base confection ingredients, and by additional artificial or natural coloring agents. "Color" also includes various hues or shades, e.g., pink and red.

In preferred embodiments, the aerated confections can comprise about 1 to 15% cornstarch as part of their saccharide component resulting from the starch application step practiced as described below.

The confections' compositions have densities of 0.10 to 1.0 g/cc, preferably about 0.1 to 0.4 g/cc and most preferably about 0.15 to 0.30 g/cc. Preferred products have a density of about 0.1 to 0.4 g/cc at moisture contents of 1 to 6%, preferably 2 to 5%.

In preferred embodiments, the pieces have a size count ranging from about 0.2 to 6/g, preferably about 1 to 6 pieces per gram, and most preferably about 4 to 6 pieces per gram. Thus, individual pieces can range in size from about 0.1 to 5 g each. As a result, these pieces generally have a bulk density of about 235 to 340 g per liter.

The present appearance modified products herein are essentially characterized by an exterior surface importantly characterized by at least a portion of which has been modified to provide an appearance disparate to the body.

In one variation, the surface can be smooth and shiny or glossy in comparison with the flat or matted appearance of the body. The smooth shiny surface is obtained, for example, by heating as described in detail below to fuse the discontinuous cellular structure of the foam to form a skin feature in the form of a continuous thin (less than 0.1 mm) film. The shiny appearance can be applied to a portion of the exterior surface, e.g., to one or both of opposed major surfaces of a planar shaped piece, or to substantially the entire surface, e.g., including the periphery of the planar piece. This thin film is to be distinguished from a conventional candy coating obtained by common panning techniques in that the coating can be formed of and thus compositionally equivalent to the body of the pieces. In minor variations, however, the film or glossy appearance results from fusing a particulate dextrose coating.

In another variation, the products appearance modified surface can be accomplished using a coating that changes the surface appearance relative to the appearance of the body of the pieces.

The coating for example can include particles of a single different color or include a multiplicity of disparately colored particles, especially carbohydrate based particles.

The particles can be water soluble. Soluble coatings can include, for example, colored sucrose crystals. For example, colored sugar particles or "sanding sugars" as they are known in the baking art are commercially available and are particularly suitable for use herein due to their low cost. In this variation, the particles can be of one color and completely obscure the second color of the underlying body. Also, sanding sugars of various colors can be mixed to form a multi-colored aggregate and applied to a surface of the pieces.

In one variation, the coatings can include an insoluble particulate coating material such as corn starch that has been dyed to a color other than white, e.g., primary colors of red, blue, or yellow. In other variations, the particles can be supplied by hydrophilic colloids that have been colored. Preferred for use is agar that has been colored to form colored agar particles. The colored agar particles are in flake form and can range in size from about 1 to 200 micron in size.

In another variation a mixture of insoluble and soluble colorants are admixed into the coating each having a separate color. The insoluble colorants impart a first color, e.g., blue, to the coated confection that is visible when the pieces are dry. Upon addition to milk such as when added to an RTE cereal, the soluble dyes in the coating (e.g., red) can dissolve expressing that color in the coating. Such coated pieces find usefulness as novel "color changing" confections that "magically" change color in milk. In such variations, it has been found that the ratio of insoluble colorants or pigments to soluble colorants or dyes can range from about 1.5:1 to about 20:1.

In other variations, the particles can comprise water soluble dyes and/or water insoluble colorants such as lake dyes per se in particulate form. If desired, the colorants and particulates can be mixed to form an aggregate particulate coating comprising both colorants and other particles.

In still other variations, the surface coating particles can include flavors. For example, powdered cinnamon can be admixed with powdered sugar in a weight ratio of about 2:1 to about 1:4.

In still other variations, the particulate coating can comprise dried fruit bits, nuts, cookie crumbs, and mixtures thereof.

The coated pieces can be formed having a coatings to base weight ratio of about 0.1:100 to about 30:100, preferably about 3:100 to 10:100.

The coatings are formed of particles having a widely varying particle size ranging from about 0.5 to 2,000 microns, preferably about 1 to 500 microns.

In still another variation, the coating can be formed into a pattern. For example, colored particulates can be applied as a graphic or text pattern. The pattern can be applied using printing (e.g., printing with edible inks or offset printing) or other image transfer techniques. In these variations, the amount of coating material to pieces is very small and on the order of 1:1,000. In still other variations, the techniques can be combined, for example, the confection pieces can be provided with a shiny surface including an overlaying image.

In still other variations, all or a portion of the optional materials that can be included into the aerated confection foam compositions from which the body of the pieces are fabricated can be admixed into the particulate topical coating.

The surface appearance modified confection pieces 80 are useful as confections having novel visual appeal.

Additionally, the appearance modified confectionery pieces find particular suitability for use as an appealing added component of food products to provide novelty or play value. For example, the pieces may be added to RTE breakfast cereal, especially sugar coated RTE cereals intended as children's breakfast cereals. In other variations, the confections can be added to dry mixes for hot chocolate or as pieces in grain based snack bars.

In a preferred embodiment, the finished RTE cereal can comprise about 65 to 99% of a conventional dried cereal (such as flakes, shreds, puffs, biscuits formed from a cooked cereal grain or dough of oats, wheat, corn, barley, rice or mixtures) and about 1% to about 35% by weight of the present novel appearance modified confectionery pieces, preferably about 20 to 30%. In more preferred embodiments, the RTE cereal pieces include a presweetener coating.

In still other variations, the present confections can be admixed with instant oatmeal, dry cocoa beverage mix (especially smaller sized pieces), and dry mixes for other products, e.g., gelatin dessert. The confections can also be used in cereal bar products, toppings for desserts such as ice cream or yogurt, or on various baked goods.

In other variations, the confections provide appealing carriers for various ethical drugs, vitamins, minerals and the like. Due to the aerated and frangible texture, the confections are easy to chew and are quickly dissolving.

Method of Preparation

The invention further provides processes for making the above-described appearance modified aerated confection and products. Referring now to the drawing, FIG. 1 shows a schematic flow diagram of a preferred embodiment in several variations of the present methods referred to generally by reference numeral 10. As illustrated, the present methods 10 include an essential initial first step 20 of providing a mass of aerated confection pieces or base pieces having at least one colored portion and having an external surface at least a portion of which is sticky. By "sticky" is meant that some particulates will adhere to the sticky surface.

In one variation, step 20 can involve supplying moist pieces 26 that are naturally sticky. In this variation, a fresh (i.e., undried) aerated foam 30 can be provided such as from an extruder in the form of a warm pliable or plastic unset foam having a moisture content of about 15 to 30%. By "plastic" is meant that the temperature of the foam is above the set point temperature of the foam structuring agent and is thus easily deformable. The confection 30 can be characterized by a pattern including a peripheral shape such as a circle, star, animal figure or other shape including both regular and irregular shapes. The pattern can further include colorations including various internal portions or filaments. The confection is allowed to set 32 to form a set foam such as by cooling. The set foam can then have starch such as white cornstarch 34 applied to the surface to reduce stickiness or dextrose 35 if a shiny surface appearance is desired. In still another variation, a colored starch 38 or blend of starches of various colors can be used. Excess starch can then be removed. The set foam can then be formed into pieces such as by a cutting step 36 thereby exposing the sticky interior to form undried set foam wafer pieces 26 having at least one sticky surface or at least a portion of the surface being sticky. The fresh pieces 26 can be fed directly into enrober 44. If desired, a small quantity of added moisture, e.g., 1 to 3% can be used to further adjust the desired stickiness of the pieces.

In other variations, the foam can be deposited into means for forming shaped pieces such as conventional starch molds and allowed to set. This technique is particularly suitable for forming pieces having a three dimensional shape rather than simply having a shaped periphery or two dimensional pieces such as wafers.

In another variation, pieces 26 can be dried in drying step 40 to form dried confections 42 not having a sticky surface and step 20 can involve applying sufficient amounts of moisture or other fixative to the surface of the confection pieces to provide the sticky surface. For example, dried confection pieces 42 having a moisture content of about 2% to less than 15% generally have a nonsticky exterior surface even without starching. Dried confections pieces 42 can be supplied to an enrober 44 and tumbled with the added moisture to render their surface sticky.

The moisture can be provided, for example, in the form of fine jet or spray of water 22 (e.g., co-sprayed or atomized with air to form a fine droplet size aerosol with air at a pressure of 40 to 60 psig), steam 24 or associated with an edible binder solution 23 to the dried pieces.

The amount of moisture is small such as on the order of 0.1 to 7% preferably about 3 to 7%. For example, an edible binder solution comprising about 20 to 40% edible binders in water. Suitable binders can include film forming carboxymethyl cellulose, starches, edible glue, maltodextrins and mixtures thereof. When the coating particles, however are soluble carbohydrates especially applying lower levels of coating particulates, smaller quantities of added moisture are employed such as 0.1% added moisture. Care should be expressed to avoid excessive moisture addition which can undesirably result in the pieces adhering to each other.

In a minor variation, a small quantity (1 to 3%) of edible oil can be used as a fixative for the particulate coating.

In another variation, the starting material comprises heated dried confection pieces 52 still hot after having been dried to a moisture content of 1 to 5%, preferably about 2 to 3.5%, and more preferably about 2 to 3%. The hot, dried confections are characterized by having a starting temperature or at least a surface temperature above their glass transition temperature. Good results are generally obtained when the pieces temperature or at least the piece surface temperature is within the range of 180 to 240° F. (82.2 to 115.5° C.), preferably 200 to 230° F. (93.3 to 110° C.). In this variation, no added moisture is employed. This variation finds particular suitability for use when the coating particles comprise colored insoluble carbohydrates. In less preferred variations, the dried confections have previously been allowed to cool such as to room temperature and are reheated to a temperature within the starting temperature range to provide heated dried pieces 52.

In still another variation, dried pieces 42 can be heated in heating step 50 such as with infrared heating to form dried heated pieces 52 having a surface that is sticky rather than the entire piece body.

The present methods further can include a step of applying particles 60 of a coating at least a fraction of which have a second color to adhere the particles to the sticky portion of the surface of the confection pieces. A prescribed amount of confection pieces and a prescribed amount of coating particles are introduced into a container so that they can be intimately mixed together. Conveniently, the applying step can be practiced in enrober 44 that tumbles the confection pieces during the particulate application step.

Thereafter, the present methods essentially comprise the step of processing 70 the coated aerated confection pieces into finished non-sticky coated pieces.

In one variation, this processing step 70 can comprise drying the coated pieces to moisture contents at which they are no longer sticky. Various drying procedures and techniques can be satisfactorily employed. A suitable finished product 80 can be obtained by drying at room temperature for a prescribed period of time. Processing step 70 can include accelerated heat drying. The surface appearance modified pieces having a particulate coating confection pieces can be charged to an endless belt 72 which convey the aerated confection pieces to one or more heated zones or tunnel 74 that is maintained at a temperature within the desired drying range to dry to a final moisture content of about 1 to 5%. The speed and length of the endless belt are controlled so as to provide a residence time within the heated zone(s) for a time within the 1 to 15 minute time range. The drying can be practiced to remove only the added moisture. In other variations, the drying can be practiced to also remove moisture associated with employed fresh high moisture base pieces rather than dried base pieces.

In another variation, processing step 70 can involve cooling in step 76 the coated pieces that have been heated in heating step 50 such as with infrared heating can be to ambient temperature to provide the desired finished non-sticky products 80 herein.

By adjustment of the type and quantity of coating, finished products can be prepared of sizes and densities within the above described ranges for the aerated confection body per se. Thus, the present improved finished aerated confectionery pieces 80 can be characterized by a density of 0.1 to 1 g/cc, preferably about 0.1 to 0.4 g/cc, and most preferably 0.15 to 0.3 g/cc. In preferred embodiments, the pieces have a size count ranging from about 0.2 to 6/g, preferably about 1 to 6/g, and most preferably about 4 to 6/g.

The finished aerated confectionery pieces can then be consumed as confections.

EXAMPLE 1

An appearance modified aerated food product of the present invention is prepared having a base fabricated from a composition having the following formulation:

| Ingredient | Weight % |
|---|---|
| Sucrose | 60.13 |
| Powdered Sugar | 16.80 |
| Dextrose | 9.46 |
| Corn syrup (42 DE) | 8.70 |
| Gelatin | 1.75 |
| Color | 0.13 |
| Flavor | 0.15 |
| Moisture | 2.88 |

The shaped pieces are prepared from this composition in the form of having about 4 to 6 pieces per gram. The base pieces have two portions of a different color.

The base pieces are provided with a topical coating comprising colored sucrose particles of a third color in a weight ratio of sucrose particles to base of about 15:100 to completely cover the exterior surface of the base.

The coating is applied by feeding base pieces having a moisture content of about 5% to an enrober with a small quantity of water to moisten and make sticky their surface. The wetted base pieces are tumbled with the sucrose coating particles to coat the pieces by adhering to the sticky surface.

The coated pieces are air dried for about 60 minutes at 150° C. to dry to a moisture content of about 4.5% to form the finished pieces.

The finished pieces are admixed with puffed oat based cereal pieces in a ratio of about 30:100 to form a children's RTE cereal.

Upon addition of cold milk to a bowl of the RTE cereal, the colored sucrose coating quickly dissolves to reveal the base having a different coating to provide "color changing" aerated pieces.

What is claimed is:

1. A method for preparing topically coated dried aerated confection pieces, comprising the steps of:
    A. Forming dried aerated confection pieces having a moisture content of about 1% to 15%, wherein the aerated confection pieces have a non-sticky outer surface;
    B. Heating a body portion of each dried aerated confection piece to develop a sticky outer surface on said body portion;
    C. Topically applying a substance to the sticky outer surface of the aerated confection pieces; and
    D. Processing the aerated confection pieces having the substance adhered thereto to form non-sticky, dried aerated confection pieces having a moisture content of about 1% to 8%.

2. The method of claim 1 wherein at least a portion of the substance is in the form of particles having a particle size of about 1 to 2,000 microns.

3. The method of claim 2 wherein at least a portion of the particles of the substance are water soluble.

4. The method of claim 3 wherein the particles include colored starch.

5. The method of claim 2 wherein the particles have a particle size of about 15 to 2,000 microns.

6. The method of claim 2 wherein at least a portion of the particles include at least one nutritive carbohydrate sweetener.

7. The method of claim 6 wherein at least a portion of the particles includes a sanding sugar.

8. The method of claim 7 wherein at least a portion of the nutritive carbohydrate sweetener is sucrose.

9. The method of claim 8 wherein the sucrose is of a color other than white.

10. The method of claim 7 wherein the nutritive carbohydrate sweetener includes dextrose.

11. The method of claim 2 wherein the weight ratio of particles to pieces ranges from about 1:100 to about 50:100.

12. The method of claim 2 wherein at least a portion of the particles is supplied by a colored hydrophilic colloid.

13. The method of claim 12 wherein at least a portion of the colored hydrophilic colloid is gum Arabic.

14. The method of claim 1 wherein the substance comprises a mixture of water soluble and water insoluble particles.

15. The method of claim 14 wherein at least a portion of the water insoluble particles are of a different color than at least a portion of the water soluble particles.

16. The method of claim 15 wherein the water insoluble particles include food grade ink pigments.

17. The method of claim 16 wherein the water soluble particles include water soluble dyes.

18. The method of claim 1 wherein step A includes the substeps of:
    providing aerated confection pieces having a moisture content of about 1 to 5%.

19. The method of claim 18 wherein step D includes cooling the coated aerated confection pieces to less than 100° F.

20. The method of claim 1 wherein the step A includes drying the aerated confection pieces to a moisture content of 1 to 5%.

21. The method of claim 1 wherein the aerated confection pieces have at least two colored portions.

22. The method of claim 21 wherein the aerated confection pieces having at least two colored portions are in a weight ratio of portions of 1:1.1 to 1:20.

23. The method of claim 1 wherein the pieces comprise a calcium ingredient.

24. The method of claim 1 wherein the pieces have a fat content of less than about 0.5%.

25. The method of claim 1 wherein the pieces have a fat content of about 1 to 30%.

26. The method of claim 25 wherein the pieces have a fat content of about 1 to 15%.

27. The method of claim 1 wherein the substance is an edible ink.

28. A method for preparing topically coated dried aerated confection pieces, comprising the steps of:
    A. forming dried aerated confection pieces having a moisture content of about 1% to 15%, wherein the pieces have a non-sticky outer surface;
    B. topically applying sticky particles to the non-sticky outer surface of the dried aerated confection pieces, said particles being sufficiently sticky to adhere to the non-sticky outer surface;
    C. processing the aerated confection pieces having the particles adhered thereto to form non-sticky, dried aerated confection pieces having a moisture content of about 1% to 8%.

29. The method of claim 28 wherein in step A the aerated confection pieces have a moisture content of about 1 to 5%.

30. The method of claim 28 wherein the particles include a hydrophilic colloid.

31. The method of claim 27 wherein the particles are in the form of flakes and have a particle size of between about 5 to 50 micron.

32. The method of claim 31 wherein the weight ratio of coating particles to pieces ranges from about 1:100 to about 3:100.

33. The method of claim 32 wherein step D includes drying the non-sticky, dried confection pieces to a moisture content of about 1 to 5%.

34. The method of claim 28 wherein the particles include gum Arabic.

35. The method of claim 34 wherein the particles of gum Arabic include a fraction of a first color and a fraction of a second color.

36. The method of claim 28 wherein the particles are applied in the form of a graphic pattern.

37. The method of claim 28 wherein the particles have a particle size of about 15 to 2,000 microns.

38. The method of claim 28 wherein at least a portion of the particles include at least one nutritive carbohydrate sweetener.

39. The method of claim 28 wherein the pieces comprise a calcium ingredient.

40. A method for preparing topically coated dried aerated confection pieces, comprising the steps of:
   A. Forming dried aerated confection pieces having a moisture content of about 1% to 15%, wherein the aerated confection pieces have a non-sticky outer surface;
   B. Applying water to a body portion of each dried aerated confection piece to develop a sticky outer surface on said body portion;
   C. Topically applying a substance to the sticky outer surface of the aerated confection pieces; and
   D. Processing the aerated confection pieces having the substance adhered thereto to form non-sticky, dried aerated confection pieces having a moisture content of about 1% to 8%.

41. The method of claim 40 wherein steps A, B and C collectively include the sub-steps of:
   providing aerated confection pieces having a moisture content of about 1 to 5%;
   applying sufficient amounts of water to the surface of the pieces to develop the sticky outer surface; and
   applying particles to the sticky surface to form sticky aerated confection pieces having the substance in particle form adhered thereto.

42. The method of claim 41 wherein at least a faction of the particles have a second color which is different from the first color.

43. The method of claim 40 wherein step B includes applying a vegetable oil to the confection pieces.

44. The method of claim 40 wherein step B includes the substep of tumbling the aerated confection pieces with added moisture to provide the aerated confection pieces with the sticky outer surface.

45. The method of claim 44 wherein at least a portion of the added moisture is provided by a binder solution containing water and a binding agent.

46. The method of claim 40 wherein the substance comprises particles.

47. The method of claim 46 wherein the particles range in size from about 1 to 2000 micron.

48. The method of claim 40 wherein at least a portion of the substance is in the form of particles having a particle size of about 1 to 2,000 microns.

49. The method of claim 48 wherein at least a portion of the particles of the substance are water soluble.

50. The method of claim 48 wherein the particles have a particle size of about 15 to 2,000 microns.

51. The method of claim 48 wherein at least a portion of the particles include at least one nutritive carbohydrate sweetener.

52. The method of claim 51 wherein at least a portion of the particles includes a sanding sugar.

53. The method of claim 52 wherein at least a portion of the nutritive carbohydrate sweetener is sucrose.

54. The method of claim 48 wherein the weight ratio of particles to pieces ranges from about 1:100 to about 50:100.

55. The method of claim 48 wherein at least a portion of the particles is supplied by a colored hydrophilic colloid.

56. The method of claim 49 wherein the particles comprise dextrose.

57. The method of claim 56 wherein in step D the pieces are dried to a moisture content of about 1% to 5%; and, additionally comprising the step of:
   E. heating the dried coated pieces to melt the dextrose and cooling to room temperature to form a shiny coating.

58. The method of claim 57 wherein step E employs infrared heat.

59. The method of claim 57 wherein heating step E is continued for about 5 to 15 seconds.

60. The method of claim 40 wherein the substance comprises a mixture of water soluble and water insoluble particles.

61. The method of claim 61 wherein at least a portion of the water insoluble particles are of a different color than at least a portion of the water soluble particles.

62. The method of claim 61 wherein the water insoluble particles include food grade ink pigments.

63. The method of claim 40 wherein the pieces comprise a calcium ingredient.

* * * * *